United States Patent [19]
Balcewicz

[11] B 3,993,868
[45] Nov. 23, 1976

[54] MINIMUM SHIFT KEYING COMMUNICATION SYSTEM

[75] Inventor: Joseph Francis Balcewicz, Hightstown, N.J.

[73] Assignee: RCA Corporation, New York, N.Y.

[22] Filed: Aug. 19, 1974

[21] Appl. No.: 498,775

[44] Published under the second Trial Voluntary Protest Program on March 2, 1976 as document No. B 498,775.

[52] U.S. Cl. ............................. 178/66 R; 325/30; 325/163; 325/320; 329/110; 332/9 R; 332/16 R
[51] Int. Cl.² ........................................ H04L 27/10
[58] Field of Search .................. 178/66 R, 66 A, 88; 325/30, 163, 320; 332/9 R, 16 R; 329/104, 107, 110, 112

[56] References Cited
UNITED STATES PATENTS

| | | |
|---|---|---|
| 2,977,417 | 3/1961 | Doelz et al. ..................... 178/66 R |
| 3,146,307 | 8/1964 | Renshaw ............................ 325/320 |
| 3,484,693 | 12/1969 | Fong ..................................... 325/30 |
| 3,674,934 | 7/1972 | Gooding et al. ...................... 178/88 |
| 3,731,233 | 5/1973 | Hutchinson ..................... 178/66 R |
| 3,743,775 | 7/1973 | Hutchinson et al. ............. 178/66 R |

*Primary Examiner*—Robert L. Griffin
*Assistant Examiner*—Jin F. Ng
*Attorney, Agent, or Firm*—Edward J. Norton; Joseph D. Lazar; Michael A. Lechter

[57] ABSTRACT

A system for communicating binary data by minimum shift keying wherein specified relationships maintained by a transmitter between the bit rate of the binary data, the frequency of a mark signal and the frequency of a space signal allow derivation in a receiver of coherent reference signals for both mark frequency and space frequency by a single phase lock loop. Provisions are also made for similar derivation of a coherent reference for a carrier frequency.

14 Claims, 2 Drawing Figures

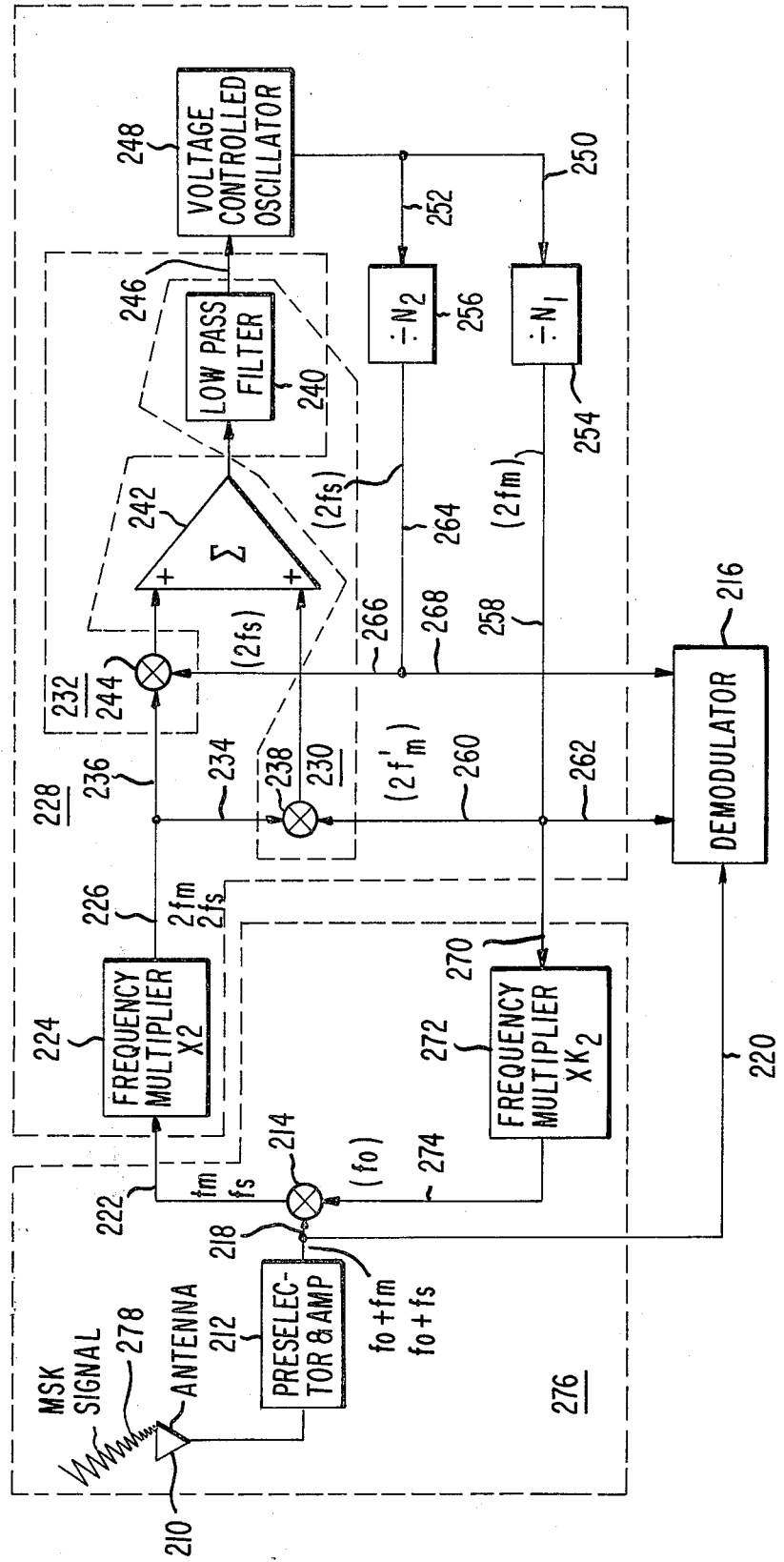

MINIMUM SHIFT KEYING COMMUNICATION SYSTEM

CROSS REFERENCE TO RELATED APPLICATIONS

Of interest is copending application Ser. No. 485,519 entitled "Transmitter for Frequency Shift Keyed Modulation," filed July 3, 1974 by H. R. Mathwich and assigned to the same assignee as the present invention.

BACKGROUND OF THE INVENTION

1. Field of the Invention

This invention relates to minimum shift keying communications systems.

2. Description of the Prior Art

With the ever increasing use of high density multi-channel radio communications, the electromagnetic energy spectrum has become overcrowded. Thus, in order to avoid inter-channel interference, strict control of communication ranges in such communication systems is desirable. Moreover, since most medium and high output power transmitters perform with higher efficiency when operating at or near saturation of their input versus output amplitude transfer function, the ability to utilize transmitters with non-linear amplitude transfer functions has become an important design criteria in such communication systems.

Frequency shift keying (FSK), a technique of communicating digital information using discrete frequencies to represent specified symbols, has properties which are desirable in controlling the bandwidth of the system and for use with non-linear transmitters. Binary FSK, for example, transmits a first (mark) frequency to represent a binary one and a second (space) frequency to represent a binary zero. The amplitude of the carrier, in the ideal case, is invariant and thus can pass through non-linear amplifiers with minimal degradation of signal quality. Further, proper choice of the difference between the mark and space frequencies and the time of switching between these frequencies can provide strict control and minimization of the radiated spectrum thereby minimizing the required channel bandwith and the spurious emission of power outside the channel bandwidth.

Minimum shift keying (MSK) is the special case of FSK wherein the difference between the mark and space frequency is at the minimum value still preserving orthogonality (zero cross-correlation) between the mark and space signals and thus providing for efficient detection of the data. Continuous phase is maintained at the transitions between the mark and space frequency signals to decrease the out-of-band signal power.

Such advantageous conditions are met by maintaining a phase-lock between the mark and space frequency signals and maintaining the separation between the mark frequency ($f_m$) and the space frequency ($f_s$) at one half of the bit rate ($R$) of the binary information to be communicated, that is, $$f_m - f_s = R/2 \qquad (1)$$

It is assumed, for the purpose of discussion, that $f_m$ is greater than $f_s$. Such a case, however, is not a requirement of or a limitation on the system.

For proper demodulation of such MSK signals, coherent replicas of the mark and space frequency signals must be generated in the receiver, i.e., the replicas must be equal in phase at the beginning of each bit. Prior art systems, such as that described in U.S. Pat. No. 3,743,775, to Hutchinson et al., issued July 3, 1973, generate such coherent reference signals by applying the received MSK signals to a square-law device, to remove phase dependence of the modulation signal on the particular data, and presenting the squared signal to two separate phaselocked loops, which respectively acquire and track mark frequency signals and space frequency signals. Thus coherent reference signals for the mark and space frequencies are generated.

However, where the information to be transmitted is such that there are long sequences of continuous ones or zeros, thereby respectively causing continuous transmission of mark frequency signals or space frequency signals, the phase-locked loop generating the reference signal for that frequency not being transmitted will drift. Thus, when a transition in the transmitted signal finally occurs, i.e. the absent frequency is again transmitted, the respective phase-locked loop will have to reaquire the frequency, during which time data will be lost. Moreover, derived reference signals for both the mark and space frequencies are required to derive a valid bit timing signal. Thus, bit timing errors will result during those periods when one or both of the phase-locked loops are not locked on their respective signals.

In conventional equipment this problem has been resolved by requiring a minimum bit transition density, i.e. a minimum number of transitions per word. However, a minimum bit transition density necessarily precludes communication of information which does not maintain the requisite minimum number of transitions.

The present invention overcomes the disadvantages and problems present in the prior art by providing coherent mark and space frequency references even in the absence of one of either mark or space frequency signals, and further eliminates any requirement for a minimum bit transition density. Moreover, the present invention includes provisions to compensate for fluctuation in the bit rate, doppler shift in the frequency of the transmitted signal and for frequency offset between receiver and transmitter.

SUMMARY OF THE INVENTION

The present invention provides an improvement in a binary minimum shift keying system comprising a transmitter, a receiver and a data source, the data source including means for providing information to the transmitter in the form of binary data and means for providing a bit rate signal indicative of the bit rate of the binary data. In accordance with the present invention, the transmitter comprises means responsive to the bit rate signal, for generating a mark frequency signal and a space frequency signal such that the mark frequency and the space frequency signals maintain the same phase at the beginning of each bit. The mark frequency further maintains a specified rational relationship to the bit rate and is separated in frequency from the space frequency by one-half the bit rate. The transmitter further comprises modulator means, receptive of the mark frequency signal, the space frequency signal, the binary data and a carrier frequency signal, for modulating the carrier signal alternatively with the mark frequency signal and the space frequency signal in accordance with the binary data, where the mark frequency and the space frequency signals are respectively indicative of first and second binary values in the data.

The receiver, according to the invention, comprises input means, for receiving the modulated signals and subtracting in frequency therefrom the carrier frequency, thereby producing an information signal; a single phaselocked loop means, responsive to the information signal, for simultaneously deriving therefrom coherent reference signals for both mark frequency and space frequency signals, irrespective of the absence of one of the mark or space frequency signals in the information signal; and demodulator means, receptive of the information signal and the derived coherent reference signals, for generating a replica of the binary data.

DESCRIPTION OF THE DRAWING

Embodiments of the invention are described in the following detailed description taken in connection with the accompanying drawing; wherein:

FIG. 2 is a block schematic illustration of an embodiment of an MSK receiver in accordance with the present invention.

DETAILED DESCRIPTION OF THE PREFERRED EMBODIMENT

Figure 1:
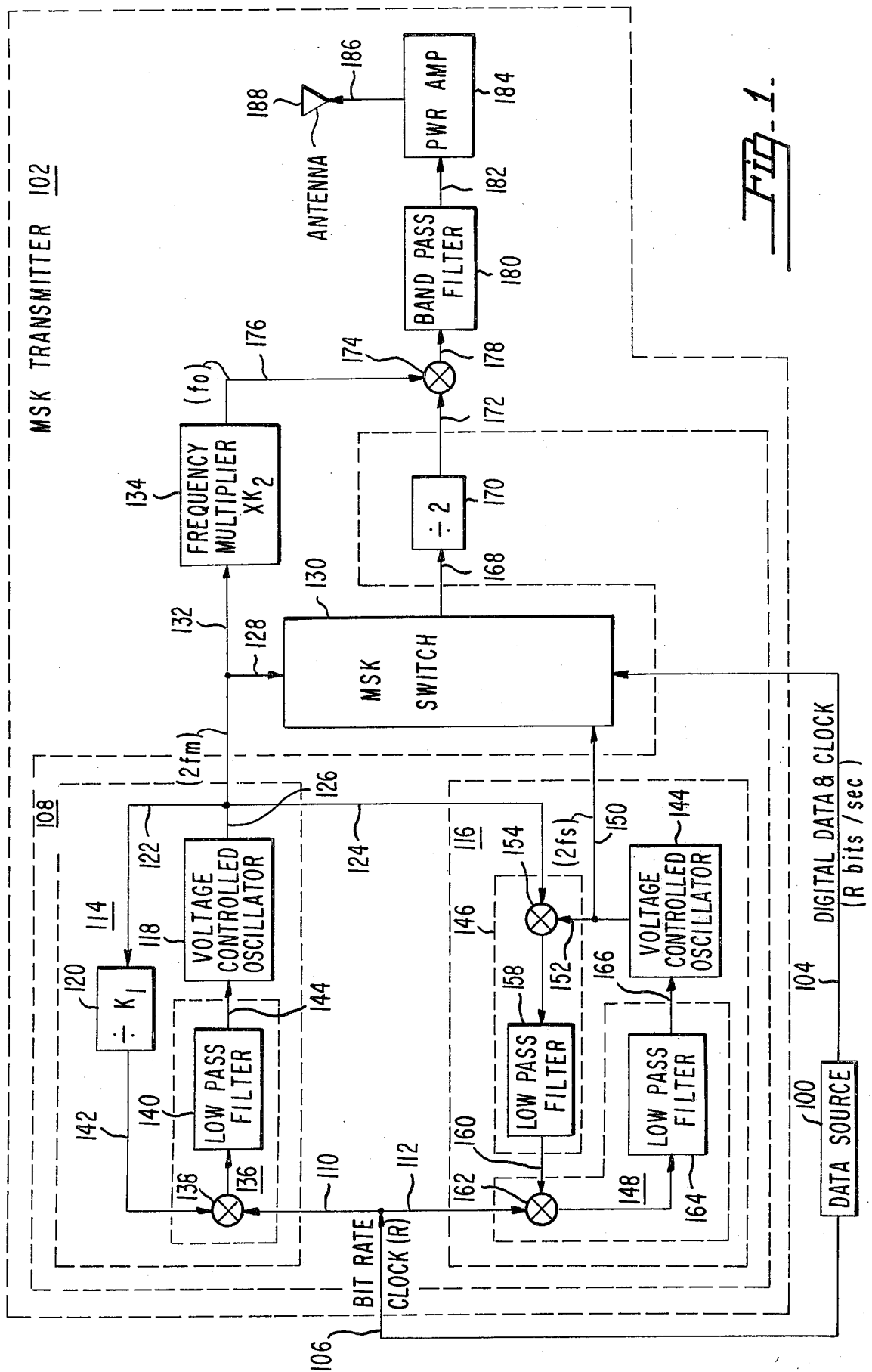
FIG. 1 is a block schematic of an embodiment of an MSK transmitter in accordance with the present invention.

The communication of data by minimum shift keying (MSK) entails transmitting a carrier signal, at a specified carrier frequency ($f_0$), modulated alternatively with mark frequency ($f_m$) and space frequency ($f_s$) signals in accordance with the data to be communicated. The mark frequency is requisitely separated in frequency from the space frequency by one-half the bit rate of the data, expressed in the following relation:

$$f_m - f_s = R/2 \qquad (1)$$

In addition, the mark and space frequency signals are required to be in phase at the beginning of each bit. To demodulate coherently such a signal, coherent reference signals for the mark and space frequencies must be developed in the receiver.

The present invention is concerned with, in particular, a minimum shift keying communication system wherein coherent reference signals for both the mark frequency and the space frequency are derived in the receiver by a single phase-locked loop.

The principle of the present invention resides in maintaining additional specified relationships between the bit rate of the binary data, the mark frequency signal and the space frequency signal. Thus, according to the present invention, mark and space frequency signals are generated in the transmitter, maintaining not only the phase-lock and frequency separation, required for MSK transmission, (equation 1 above) but also, the mark frequency is generated as a rational function of the bit rate of the binary data ($R$), as follows:

$$f_m = \frac{K_1 R}{2} \qquad (2)$$

where $K_1$ is a rational number greater than unity.

It follows from equations (1) and (2) that the mark frequency ($f_m$) and space frequency ($f_s$) are also rationally related, in the following manner:

$$\frac{f_m}{f_s} = \frac{K_1}{K_1 - 1} \qquad (3)$$

Thus, the mark frequency and space frequency can be derived from a common source in the receiver and coherent reference signals for both the mark and space frequencies can be simultaneously derived by phase-locking the common source to the incoming MSK signal.

Referring now to the drawing, there is shown in FIG. 1 a MSK transmitter, generally indicated as 102, in accordance with the invention. A suitable data source 100 provides to the MSK transmitter 102, over conductor 106, a signal indicative of the bit rate of the binary data to be transmitted. More specifically, the bit rate signal on conductor 106 is applied to means, generally indicated as 108, for generating mark and space frequency signals in accordance with the predetermined relationships of the present invention. The bit rate signal on line 106 is applied, over conductors 110 and 112, to a first and a second phase-locked loop (PLL) 114 and 116, respectively.

The first PLL 114 comprises a voltage controlled oscillator (VCO) 118, a suitable frequency divider 120 and subtraction means 136. The bit rate signal on conductor 110 is applied to the subtraction means 136, suitably a conventional double balanced mixer 138 connected to a low pass filter 140. The second input to subtraction means 136 is the output signal of divider means 120 over a conductor 142. Divider 120, has as an input signal, over conductor 122, the output signal of VCO 118. The output signal of subtraction means 136 is applied over conductor 144 as a control signal to VCO 118.

The output signal of VCO 118 is taken as the output signal of first PLL 114 and is applied to a conductor 126 and therefrom, respectively, over conductor 128 to a suitable MSK switch 130, over a conductor 132 to a suitable frequency multiplier 134, and over conductor 124 to second phase locked loop 116. For a description of a suitable MSK switch 130, reference is made to the above-mentioned copending application, Ser. No. 485,519, entitled "Transmitter for Frequency Shift Keyed Modulation," filed July 3, 1974. A description of an alternative suitable MSK switch may be found in U.S. Pat. No. 3,205,441 issued Sept. 7, 1965, to H. C. Likel, entitled "Frequency Shift Signaling System."

Second phase locked loop (PLL) 116 comprises a voltage controlled oscillator (VCO) 144, a first subtraction means 146 and second subtraction means 148. The output signal of VCO 144 is applied over conductor 152 to first subtraction means 146 suitably a conventional double balanced mixer 154 connected to a low pass filter 158. The second input to first subtraction means 146 is the output signal of the PLL 114 over conductor 124. The output signal of subtraction means 146 is applied over conductor 160 to second subtraction means 148, formed suitably of a conventional double balanced mixer 162 connected to low pass filter 164. The second input signal to subtraction means 148 is the bit rate signal (R) over conductor 112. The output signal of subtraction means 148 is applied over conductor 166 as a control signal to VCO 144.

The output signal of VCO 144 serves as the output signal of PLL 116 and is applied over conductor 150 to MSK switch 130.

Digital data and the bit rate signal R from data source 100 are applied over line 104 to MSK switch 130. As noted above, MSK switch 130 is also receptive of the output signals of PLLs 114 and 116. The output signal of MSK switch 130 is applied over conductor 168 to a suitable (divide-by-two) frequency divider 170. The output signal of frequency divider 170 is applied over conductor 172 to a mixer 174, the other input of which being the output signal of frequency multiplier 134 over conductor 176. The output signal of mixer 174 is applied over conductor 178 to a bandpass filter 180 and therefrom over conductor 182 to a power amplifier 184. The amplified signal is then passed over conductor 186 to a suitable transmitting antenna 188.

In operation, first PLL 114 of MSK transmitter 102 generates an output signal at twice the mark frequency ($2f_m$) specified by the predetermined rational relationship to the bit rate (equation (2)). The second PLL 116 generates a signal at twice the specified space frequency ($2f_s$), maintaining the requisite phase-lock and frequency separation relationship with the generated mark frequency signal.

More specifically, the $2f_m$ output signal of first PLL 114 is maintained as a rational function of the bit rate R as follows. The instantaneous $2f_m$ signal, i.e., output signal of VCO 118, is applied to frequency divider 120, which is arranged to divide the frequency of the instantaneous $2f_m$ signal by that constant of proportionality between $2f_m$ and bit rate R specified by the predetermined rational relationship of the present invention, i.e., $K_1$, from equation 2. In accordance with such relationship, it is desired that the output of VCO 118 be equal to $K_1R$. Thus, the output signal of divider 120 is ideally (in phase-locked condition) equal to R. Accordingly, subtraction means 136, which is receptive of the actual bit rate signal (over conductor 110) and the output signal of divider 120 (over conductor 142), produces an error signal indicative of the frequency and phase difference between the instantaneous mark frequency and the desired mark frequency in accordance with the specified rational relationship with the bit rate. The error signal is accordingly applied to VCO 118 to effect any necessary correction.

The $2f_s$ output signal of second PLL 116 is maintained with the requisite phase-lock and frequency separation relationship with the generated $2f_m$ signal as follows. First subtraction means 146 serves to subtract the instantaneous $2f_s$ signal, as generated by VCO 144, from the instantaneous $2f_m$ signal, as generated by first PLL 114. In accordance with the requisite MSK relationship (equation (1)) it is desired that the separation between the $2f_s$ and $2f_m$ frequencies be equal to the bit rate R. Thus, second subtraction means 148, which is receptive of the output signal of the first subtraction means 146 (indicative of the instantaneous frequency separation) and the actual bit rate signal (as applied over conductor 112), produces an error signal indicative of the frequency (and phase) deviation between the instantaneous frequency separation and the desired separation (equal to the bit rate R). The error signal is accordingly applied as a control signal to VCO 144 to effect any necessary corrections.

The $2f_m$ frequency signal from phase lock loop 114 is applied over conductor 126 and therefrom over conductor 128 to MSK switch 130. Similarly, the $2f_s$ frequency signal from phase lock loop 116 is applied over conductor 150 to MSK switch 130. MSK switch 130 produces an output signal which is alternatively at frequency $2f_m$ or $2f_s$, in accordance with the applied digital data. Frequency divider means 170 acts to transform the output signal of MSK switch into a signal having $f_m$ and $f_s$ spectral components.

Frequency multiplier 134 is utilized to generate, from the $2f_m$ signal, the carrier frequency ($f_0$) signal. The carrier frequency signal is applied over conductor 176 to mixer 174, which serves to modulate the carrier frequency with the alternative mark frequency or space frequency signals. The modulated signal is thereafter filtered and amplified, then transmitted, via bandpass filter 180, power amplifier 184 and antenna 188.

It should be noted that the system of the present invention is not limited to the above-described transmitter. Any transmitter configuration capable of establishing and maintaining the requisite rational relationships between $f_m, f_s, f_0$ and R set forth above, for instance, a transmitter wherein all the frequencies are generated by a common source (a system clock), could be utilized therein.

Referring now to FIG. 2, there is shown in a schematic block diagram of an MSK receiver, in accordance with the present invention, having a suitable antenna 210 coupled to a conventional preselector and amplifier 212. The preselector and amplifier 212 is coupled to a suitable mixer 214 and a suitable demodulator 216, over conductor 218 and 220 respectively. The output signal of mixer 214 is applied over conductor 222 to a suitable single phase locked loop means generally indicated as 228. More specifically, the output signal of mixer 214 is applied to a frequency multiplier device 224, suitably of the square law form. The output signal of frequency multiplier 224 is applied over conductor 226 and therefrom respectively over conductors 234 and 236, to a first and a second frequency and phase subtraction means, generally indicated as 230 and 232. The first subtraction means 230, in the preferred embodiment of the present invention comprises a conventional double balanced mixer 238 and a suitable low pass filter 240 connected through a suitable summing amplifier 242. Similarly, second subtraction means 232 comprises a conventional double balanced mixer 244 also connected through summing amplifier 242 to the low pass filter 240. The combined output signals of the first and second subtraction means i.e. the output signal of low pass filter 240, are applied over conductor 246 as control signals to a voltage controlled oscillator (VCO) 248. It should be noted that separate low pass filters could be utilized in the first and second subtraction means, the output signals of which could then be summed and applied to the VCO 248. The output signal of VCO 248 is applied over conductors 250 and 252 to a first and a second frequency divider, 254 and 256, respectively. The output signal of frequency divider 254 is applied over conductor 258, and therefrom over conductor 260 to mixer 238 of first subtraction means 230, over a conductor 262 to demodulator 216, and over conductor 270 to a frequency multiplier 272. The output signal of the second frequency divider 256 is applied over conductor 264, and therefrom over conductor 266 to mixer 244 of second subtraction means 232 and over conductor 268 to the demodulator 216. The output signal of frequency multiplier 272 is applied over conductor 274 to mixer 214.

In operation, antenna 210, preselector and amplifier 212, mixer 214 and frequency multiplier 272 comprise an input means, generally indicated as 276, which receives an MSK signal 278. More specifically, the MSK signal is received at antenna 210 and amplified and filtered by preselector and amplifier 212. The MSK signal is therefrom applied to mixer 214, which acts to subtract in frequency therefrom the carrier frequency $f_o'$ as generated for reference by frequency multiplier 272, as will hereinafter be explained. The output signal of mixer 214 is thus an information signal indicative of the binary data and is applied over line 222 to the single phase locked loop means 228.

The single phase-locked loop means 228 simultaneously derives from the information signal coherent reference signals for both the mark frequency ($f_m$) and space frequency ($f_s$) irrespective of the absence of either mark frequency or space frequency from the information signal. More specifically, frequencies of the information signal are multiplied by a predetermined even factor, in the preferred embodiment, two, by frequency multiplier 224. Frequency multiplier 224 acts to remove data dependence from the phase of the individual bits of the multiplied information signal and insures that the multiplied information signal is a continuous wave of, for example, $2f_m$ and $2f_s$ spectral components which have equal phase at the beginning of each bit. The frequency multiplied information signal is then applied to the first and second subtraction means 230 and 232. The voltage controlled oscillator 248, in accordance with the invention, is arranged to generate an output signal at a frequency ($f_{VCO}$) from which both the mark ($f_m$) and space ($f_s$) frequencies can be derived by simple divisions by rational numbers. Thus, where multiplier 224 is a frequency doubler, divider means 254 and 256 divide the frequency of the output signal of VCO 248 by rational constants $N_1$ and $N_2$, respectively, to derive reference signals at twice the mark frequency ($2f_m'$) and twice the space frequency ($2f_s'$), $N_1$ and $N_2$ are rational numbers such that;

$$2N_1 f_m = 2N_2 f_s = f_{VCO} \tag{4}$$

Thus, the ratio of $N_2$ to $N_1$ is equal to the ratio of $f_m$ to $f_s$, and from equation 3 it follows that $$N_2 = \frac{K_1}{K_1 - 1} N_1 \tag{5}$$

Where multiplier 224 is other than a frequency doubler, a suitable factor replaces the coefficient 2 in equation (4) such that the frequencies of the derived signals are respectively equal to the multiplied information signal frequencies.

It should be noted, that while the derivation of the $2f_m'$ and $2f_s'$ signals is characterized as being performed by frequency dividers 254 and 256, since $N_1$ and $N_2$ are rational numbers, the actual implementation utilizes frequency multipliers, e.g. $N_1 = \frac{1}{2}$ implies multiplication by 2.

The derived reference signals $2f_m'$ and $2f_s'$ are respectively fed back over conductors 260 and 266 to the first and second subtraction means 230 and 232. Thus, when the received information signal is instantaneously a space frequency signal, the output signal of second subtraction means 232 is indicative of the frequency and phase difference between the derived reference space frequency ($2f_s'$) signal and the received space frequency ($f_s$) signal (doubled by multiplier 224) and is applied over conductor 246 to VCO 248 to effect any necessary corrections. During the time intervals that the information signal is a space frequency signal, the output signal of first subtraction means 230 is in effect zero. More specifically, the multiplied information signal from frequency multiplier 224 is applied over conductor 234 to mixer 238 of subtraction means 230, and over conductor 236 to mixer 244 of subtraction means 232. The frequency components of the output signals of the mixers consist of the sum and the difference of the respective input signal frequencies. Thus, with the instantaneous information signal a space frequency, mixer 244, having applied as input signals the multiplied information signal and the space frequency reference ($2f_s'$) signal, will produce frequency components at twice the space frequency plus twice the derived reference space frequency ($2f_s + 2f_s'$) and at twice the received space frequency minus twice the derived space frequency ($2f_s - 2f_s'$). Similarly, mixer 238, having as input signals the multiplied information signal and the mark frequency reference signal $2f_m'$, will generate an output signal with frequency components at ($2f_s + 2f_m'$) and ($2f_s - 2f_m'$). The output signals of mixers 238 and 244 are summed by summing amplifier 242 and applied to low pass filter 240. Low pass filter 240 acts to block all frequency components that are not essentially d.c. (zero frequency) voltages. Thus, only the ($2f_s - 2f_s'$) frequency component is passed as a control voltage to VCO 248.

When the instantaneous information signal is a mark frequency, only mixer 238 in first subtraction means 230 produces a frequency component approaching d.c., i.e. ($2f_m - 2f_m'$), which is passed by low pass filter 240 to VCO 248.

It should be apparent that a control signal is thus continuously applied to VCO 248, irrespective of the absence of one of the mark or the space frequency from the information signal. Single phase-locked loop means 228 is thereby continuously maintained locked on the information signal and thus continuously produces coherent mark and space frequency reference signals.

The derived mark frequency reference signal $2f_m'$ is also applied over conductor 270 to frequency multiplier 272. It was noted in conjunction with the MSK transmitter of FIG. 1, that the carrier frequency $f_o$ was derived by means of frequency multiplier 134 from the generated $2f_m$ signal. It follows that, a coherent reference signal ($f_o'$) for the carrier frequency $f_o$ can therefore be derived from the mark frequency reference signal $2f_m'$ by reconstructing the transmitter frequency multiplication in the receiver via frequency multiplier 272. Thus, a coherent reference signal for the carrier frequency is generated by multiplier 272 and applied over conductor 274 to mixer 214. It should therefore be apparent that single phase lock loop 228 also serves, in effect, to lock the carrier frequency reference signal $f_o'$ to the carrier frequency signal received $f_o$.

In practice, a suitable MSK system according to the invention may process a bit rate (R) of 5 megabits per second with a mark signal having a frequency ($f_m$) of 30 MHz and a space signal having a frequency ($f_s$) of 27.5 MHz, and a carrier frequency ($f_o$) of 3,000 MHz.

It should be understood that although the various conductors interconnecting with the elements in FIGS. 1 and 2 are shown as single lines, they are not so shown in a limiting sense and that the conductors may comprise plural connections as understood in the art.

It is apparent from the foregoing description that the present invention provides a particularly advantageous MSK communication system by maintaining mark frequency, space frequency and carrier frequency all in rational relationship with the bit rate of the binary data. The system is thus impervious to bit rate drift (due to oscillator instabilities, for example), and any doppler shift or frequency translation error. Although only the preferred embodiment of the present invention has been described herein, it is not intended that the invention be restricted hereto. Modifications may be made in design and arrangement of the elements without departing from the spirit of the invention.

What is claimed is:

1. A minimum shift keying (MSK) transmitter for communicating binary data at a given bit rate, said data being represented by first and second frequency signals respectively indicative of predetermined values of said data, comprising:
   a. input data source means for providing said data and a clock signal indicative of said bit rate;
   b. a first phase locked loop (PLL) means, responsive to said clock signal, for generating a first frequency signal, the ratio of said first frequency to said bit rate being a predetermined ratio of integers, said first PLL means including a frequency divider for maintaining said predetermined ratio of integers;
   c. a second phase locked loop means, responsive to said clock signal and said first frequency signal, for generating said second frequency signal such that the frequency difference between said first frequency signal and said second frequency signal is one half the bit rate of said data; and
   d. means, responsive to said data and said first and second frequency signals, for transmitting either said first frequency signal or said second frequency signal in accordance with said data.

2. A transmitter for transmitting a MSK signal in a system for communicating, by minimum shift keying (MSK), binary data having a given bit rate, said system being of the type including said transmitter and a receiver for receiving and demodulating said MSK signal, wherein the MSK signal comprises bits of mark frequency and space frequency signals in accordance with said binary data, said mark and space frequencies being respectively indicative of predetermined values in said data, said mark and space frequencies being separated in frequency by an amount substantially equal to one half of said bit rate, said transmitter including a data input source for generating a signal indicative of said data, first means for generating a signal indicative of said bit rate, second means for generating said mark and space frequency signals, and third means responsive to said mark and space frequency signals and said data signal, for generating said MSK signal, the improvement wherein:
   said second means generates said mark and space frequency signals in phase-locked relation with the ratio of said mark and space frequencies being a first predetermined ratio of integers, said second means comprises:
   a first phase locked loop (PLL), responsive to said bit rate signal, for generating a signal indicative of said mark frequency, the ratio of said mark frequency to said bit rate being a second predetermined ratio of integers,
   said first PLL including a frequency divider for maintaining said second predetermined ratio of integers; and
   wherein said second means further comprises a second phase locked loop, responsive to said bit rate signal and the output signal of said first phase locked loop, for generating a signal indicative of said space frequency.

3. A method of communicating binary data at a given bit rate by minimum shift keying comprising:
   a. generating a mark frequency signal and a space frequency signal such that said mark frequency signal and space frequency signal are equal in phase at the beginning of each bit of said binary data, said mark frequency and said space frequency being separated in frequency by one half of said bit rate of said binary data, and the ratio of said mark frequency and said bit rate being maintained as a predetermined ratio of integers;
   b. modulating a carrier frequency signal alternatively with said mark frequency signal and said space frequency signal in accordance with said binary data, said mark frequency and said space frequency signals being respectively indicative of a first and a second binary value in said data;
   c. transmitting said modulated signal;
   d. receiving said modulated signal;
   e. adjustably generating an intermediate reference signal having a frequency proportional to both said mark and space frequencies;
   f. deriving from said intermediate reference signal, a first coherent reference signal indicative of said mark frequency by dividing the frequency of said intermediate reference signal by the constant of proportionality between said mark frequency and said intermediate reference signal frequency and a second coherent reference signal indicative of said space frequency by dividing the frequency of said intermediate reference signal by the constant of proportionality between said space frequency and said intermediate reference signal frequency;
   g. generating a feedback signal alternatively indicative of frequency and phase differences between said first reference signal and said mark frequency modulation signals or between said second reference signal and said space frequency modulation signals, in accordance with said binary data and adjusting said intermediate reference signal frequency in accordance with said feedback signal;
   h. applying said modulated signal and said coherent reference signals to a demodulator, and
   i. demodulating said modulated signal.

4. A minimum shift keying (MSK) receiver for receiving carrier signals modulated by binary data at a given data rate, said data being represented by first and second frequency signals respectively indicative of predetermined values of said data, comprising:
   a. means for receiving said modulated carrier signals;
   b. means for generating a third frequency signal having a frequency proportional to both frequencies of said first and second frequency signals;
   c. means, responsive to said third frequency signal, for generating simultaneously fourth and fifth frequency signals corresponding respectively to said first and second frequency signals; and
   d. demodulator means, responsive to said fourth and fifth frequency signals, for deriving binary data from said modulated carrier signals; and e. means for determining the difference between said first and fourth frequency signals and the difference between said second and fifth frequency signals and providing control signals respectively indicative of said differences;

said third frequency signal generating means including a voltage controlled oscillator (VCO) responsive to said control signals, whereby, in response to said modulated carrier signals, both of said fourth and fifth frequency signals are continuously generated regardless of the sequence of the binary data.

5. A receiver for receiving and demodulating a MSK signal in a system for communicating, by minimum shift keying (MSK), binary data having a given bit rate, said system being of the type including a transmitter for transmitting a carrier signal modulated with a MSK signal and said receiver, wherein said MSK signal comprises bits of mark frequency and space frequency signals in accordance with said binary data, said mark and space frequencies being respectively indicative of predetermined values in said data, said mark and space frequencies being separated in frequency by an amount substantially equal to one-half of said bit rate, said receiver including; first means for receiving said modulated signal including means for generating a signal indicative of said MSK signal, second means, responsive to said modulated signal and first and second reference signals indicative of said mark and space frequencies, for demodulating said modulated signal and third means for generating said first and second reference signals, the improvement wherein said third means comprises:

a. fourth means, responsive to said modulated signal, for adjustably generating an intermediate reference signal having a frequency proportional to both said mark and said space frequencies, wherefrom both said first and second reference signals are continuously derived so long as either of said mark or space frequency signals are present in said MSK signal;

b. fifth means, responsive to said intermediate reference signal, for generating said first and second reference signals; and c. feedback means, responsive to said first and second reference signals and said signal indicative of said MSK signal, for adjusting said intermediate reference signal.

6. The receiver of claim 5, wherein:

a. said fourth means includes a voltage controlled oscillator (VCO) responsive to control signals applied thereto, for generating said intermediate reference signal, b. said fifth means comprises first and second frequency dividers, each responsive to said intermediate reference signal, said first and second frequency dividers respectively generating output signals having a frequency equal to the frequency of said intermediate reference signal divided by the constant of proportionality between said intermediate reference signal frequency and said mark and space frequencies; and further, wherein:

c. said feedback means comprises, first subtraction means, responsive to said first reference signal and said signal indicative of said MSK signal for generating an output signal indicative of frequency and phase differences between said mark frequency signals in said MSK signal and said first reference signal, second subtraction means, responsive to said second reference signal and said signal indicative of said MSK signal, for generating a signal indicative of frequency and phase differences between said space frequency signals in said MSK signal and said second reference signal, and summing means, responsive to the output signals of said first and second subtractive means, for generating said control signal to said VCO.

7. In a system for communicating, by minimum shift keying (MSK), binary data having a given bit rate, said system being of the type including a transmitter for transmitting a MSK signal and a receiver for receiving and demodulating said MSK signal, wherein the MSK signal comprises bits of mark frequency and space frequency signals in accordance with said binary data, said mark and space frequencies being respectively indicative of predetermined values in said data, said mark and space frequencies being separated in frequency by an amount substantially equal to one half of said bit rate, said transmitter including: a data input source for generating a signal indicative of said data, first means for generating a signal indicative of said bit rate, second means for generating said mark and space frequency signals, third means responsive to said mark and space frequency signals and said data signal, for generating said MSK signal; a carrier signal source for generating a carrier signal at a predetermined carrier frequency, and fourth means, for modulating said carrier signal with said MSK signal and for transmitting said modulated signal to said receiver;

said receiver including: fifth means for receiving said modulated signal including means for generating a signal indicative of said MSK signal, sixth means, responsive to said modulated signal and first and second reference signals indicative of said mark and space frequencies for demodulating said modulated signal, and seventh means for generating said first and second reference signals, the improvement wherein:

said second means in said transmitter generates said mark and space frequency signals in phase-locked relation and with the ratio of said mark and space frequencies being a first predetermined ratio of integers; and further wherein said seventh means, comprises eighth means, responsive to said modulated signal, for adjustably generating an intermediate reference signal having a frequency proportional to both said mark and said space frequencies, wherefrom both said first and second reference signals are continuously derived so long as either of said mark or space frequency signals are present in said MSK signal;

ninth means, responsive to said intermediate reference signal, for generating said first and second reference signals; and feedback means, responsive to said first and second reference signals and said signal indicative of said MSK signal, for adjusting said intermediate reference signal in accordance with said MSK signal.

8. The MSK system of claim 7 wherein said second means comprises:

tenth means, responsive to said bit rate signal, for generating said mark frequency signal in accordance with said bit rate, the ratio of said mark frequency to said bit rate being a second predetermined ratio of integers; and eleventh means, responsive to said bit rate signal, and a signal indicative of said mark frequency signal, for generating said space frequency signal.

9. The MSK system of claim 7, wherein
said second means in said transmitter for generating said mark and space frequency signals comprises:
a first phase locked loop, responsive to said bit rate signal, for generating an output signal phase-locked to said bit rate signal and having a frequency in accordance with said bit rate, the ratio of said output signal frequency and said bit rate being a second predetermined ratio of integers;
a second phase locked loop, responsive to said bit rate signal and said first phase locked loop output signal, for generating an output signal phase-locked to said first phase locked loop output signal and separated in frequency therefrom by said bit rate; and
first divider means for dividing the respective output signals of said first and second phase locked loops by two, thereby respectively producing said mark and space signals.

10. The system of claim 9, wherein:
said first phase locked loop comprises:
a first voltage controlled oscillator (VCO), responsive in frequency to a first control signal applied thereto, for generating a first VCO output signal,
second divider means, receptive of said first VCO output signal, for producing a first feedback signal having a frequency equal to that of said first VCO output signal divided by a first constant, said constant being in accordance with said second predetermined ratio of integers;
first subtraction means, receptive of said bit rate signal and said first feedback signal, for generating said first control signal; and;
said second phase locked loop comprises:
a second voltage controlled oscillator, responsive in frequency to a second control signal applied thereto, for generating a second VCO output signal;
second subtraction means, responsive to said second VCO output signal and said first VCO output signal for generating a second feedback signal indicative of the phase and frequency difference between said second VCO output signal and said first VCO output signal; and
third subtraction means, receptive of said second feedback signal and said bit rate signal, for producing said second control signal, said second control signal being indicative of the frequency and phase deviation of said second feedback signal from said bit rate signal.

11. The system of claim 7 wherein:
said eighth means in said receiver for generating said intermediate reference signal comprises;
a VCO, for generating an output signal at a frequency in accordance with a control signal applied thereto;
said ninth means for generating said first and second reference signal comprises;
first and second frequency divider means, both receptive of said VCO output signal, for respectively producing output signals having frequencies equal to the frequency of said VCO output signal divided by a first and second predetermined constant,
the ratio of said first and second constants being equal to said first predetermined ratio of integers; and wherein
said feedback means is responsive to said signal indicative of said MSK signal and the respective output signals of said first and second frequency divider means, and generates said control signal,
said control signal being indicative of frequency and phase deviations of said first divider means output signal from mark frequency signals in said MSK signal and of said second divider means output signal from space frequency signals in said MSK signal.

12. The MSK system of claim 11 wherein: said feedback means comprises:
first subtraction means, responsive to said first reference signal and said signal indicative of said MSK signal, for generating an output signal indicative of frequency and phase differences between said mark frequency signals in said MSK signal and said first reference signal,
second subtraction means, responsive to said second reference signal and said signal indicative of said MSK signal, for generating a signal indicative of frequency and phase differences between said space frequency signals in said MSK signal and said second reference signal, and
summing means, responsive to the output signals of said first and second subtractive means, for generating said control signals to said VCO.

13. The system of claim 7 wherein:
the ratio of said carrier frequency and said mark frequency is a second predetermined ratio of integers;
said fifth means, in said receiver, includes subtraction means, responsive to said modulated signal and a third reference signal indicative of said carrier frequency signal, for generating said signal indicative of said MSK signal; and
said receiver further includes tenth means for deriving from said first reference signal, said third reference signal.

14. The system of claim 13, wherein:
said carrier signal source comprises a frequency multiplier, responsive to said mark frequency signal, and
said tenth means for deriving said third reference signal comprises a frequency multiplier, responsive to said first divider means output signal.

* * * * *